Patented June 16, 1931

1,810,552

UNITED STATES PATENT OFFICE

LUDWIG J. CHRISTMANN, OF JERSEY CITY, AND DAVID W. JAYNE, JR., OF ELIZABETH, NEW JERSEY, ASSIGNORS TO AMERICAN CYANAMID COMPANY, OF NEW YORK, N. Y., A CORPORATION OF MAINE

SECONDARY BUTYL XANTHATES

No Drawing.   Application filed April 14, 1930.   Serial No. 444,345.

This invention relates to a new composition of matter, more particularly to certain xanthates and compositions containing such xanthates.

Various xanthates have been known and have found industrial application, among such xanthates being potassium ethyl xanthate and the corresponding xanthates obtained from the alcohols of fusel-oil.

We have discovered that xanthates of the alkali metals may be prepared from secondary-butyl alcohol. This alcohol is not contained in fusel-oil and is not generally considered a product resulting from a fermentation process. Commercially, secondary-butyl alcohol is obtained from the by-products of the cracking of petroleum oils which results in the production of unsaturated hydrocarbons which are treated to produce secondary-butyl alcohol. This alcohol, which boils at approximately 99.8° C. is caused to react under suitable conditions with carbon bi-sulphide and caustic alkali, as for example, sodium hydroxide or potassium hydroxide. The resulting product may be recovered in the dry state containing water of crystallization and probably two molecules of water for each molecule of the xanthate. Upon exposure to air, the xanthates effloresce, giving up at least part of the water of crystallization. Upon warming in a current of air substantially all of the water of crystallization may be removed and an anhydrous product obtained.

The final products may be represented by the following structural formula, in which M indicates an alkali metal, such as sodium or potassium.

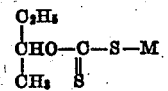

In order to produce sodium secondary-butyl xanthate, we mix 90.5 liters of secondary-butyl alcohol with 60 liters of carbon bi-sulphide in a suitable vessel, immersed in an ice bath. 52 liters of sodium hydroxide solution containing .766 grams NaOH per cc. are added very slowly with mechanical stirring. The resulting product consists of a slurry of crystals in a red oil. The crystals are filtered, washed and air dried giving the desired product.

In order to produce potassium secondary-butyl xanthate, the same procedure is followed with the difference that in place of sodium hydroxide solution, a solution of 56 kilos of potassium hydroxide in 40 liters of water is used.

These compounds may be very effectively produced by a reaction as the result of which the product obtained is dry and crystalline. To accomplish this we may take 38 pounds of carbon bi-sulphide and mix the same in a suitable vessel provided with a mechanical agitator with 37 pounds of secondary-butyl alcohol. 11 pounds of flake sodium hydroxide are added and the mixture agitated for about 30 minutes. 18 pounds of an aqueous solution of sodium hydroxide (50% by weight) are added rapidly and the agitation is continued with the use of cooling water to prevent a rise in temperature. The resulting product is substantially dry and crystalline, containing water of crystallization which may be allowed to remain in the material or may be driven out by suitable treatment with heat or with a current of warm air passing through the material.

In order to produce compositions containing these compounds, we may take 50 kilos of sodium mercaptobenzothiazol, 10 liters of carbon bisulphide, 15.25 liters of secondary-butyl alcohol and a solution of 18.75 kilos of sodium hydroxide in 18.75 liters of water. This is caused to react in a manner similar to the reactions described above giving a product which is a very intimate mixture of sodium secondary-butyl xanthate and sodium mercaptobenzothiazol.

It is apparent that the methods of manufacture of secondary-butyl xanthates and of mixtures containing the same may be varied and may differ greatly from the methods described herein. For example, the sodium hydroxide may all be added to the reaction mixture in solid form, and water added with agitation, instead of an aqueous solution of the sodium hydroxide. Our invention is not directed to the specific details of the methods of preparation of the substances, but is directed to the product as specified in the claims appended hereto.

What we claim is:
1. Alkali metal secondary-butyl xanthate.
2. Alkali metal secondary-butyl xanthate containing water of crystallization.
3. Sodium secondary-butyl xanthate.
4. Sodium secondary-butyl xanthate containing water of crystallization.

In witness whereof, we have hereunto subscribed our names this 11th day of April, 1930.

LUDWIG J. CHRISTMANN.
DAVID W. JAYNE, Jr.